US010534414B2

(12) United States Patent
Daijavad et al.

(10) Patent No.: US 10,534,414 B2
(45) Date of Patent: Jan. 14, 2020

(54) DISAGGREGATED MOBILE CLIENT (71) Applicant: International Business Machines Corporation, Armonk, NY (US)

(72) Inventors: Shahrokh Daijavad, Morgan Hill, CA (US); Alberto Valdes Garcia, Hartsdale, NY (US); Dinesh C Verma, Mount Kisco, NY (US); Bodhisatwa Sadhu, White Plains, NY (US); Kai Schleupen, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 135 days.

(21) Appl. No.: 14/620,777

(22) Filed: Feb. 12, 2015

(65) Prior Publication Data
US 2016/0239059 A1    Aug. 18, 2016

(51) Int. Cl.
*G06F 1/26* (2006.01)
*G06F 1/16* (2006.01)
*G06F 1/3203* (2019.01)

(52) U.S. Cl.
CPC .............. *G06F 1/26* (2013.01); *G06F 1/163* (2013.01); *G06F 1/1613* (2013.01); *G06F 1/1637* (2013.01); *G06F 1/3203* (2013.01)

(58) Field of Classification Search
CPC .................................. G06F 1/3203; G06F 1/26
(Continued)

(56) References Cited

U.S. PATENT DOCUMENTS 5,014,314 A * 5/1991 Mulford ................ H04W 84/08
                                                      370/314
6,584,181 B1    6/2003 Aktas et al.
(Continued)

FOREIGN PATENT DOCUMENTS

CA        2752993 A1    7/2012
WO    1999066414 A1   12/1999
(Continued)

OTHER PUBLICATIONS

Vijay Raghunathan, Experience with a low power wireless mobile computing platform document No. 01349367.*
(Continued)

*Primary Examiner* — Volvick Derose
(74) *Attorney, Agent, or Firm* — Patent Portfolio Builders PLLC (57) ABSTRACT A portable computing system includes a portable computing device consisting essentially of a logical processor, a memory in communication with the logical processor with operating system software, a high speed, secure wireless communication module in communication with the logical processor, an integrated power source suitable to provide all power needs of the portable computing device and an integrated electric power generation mechanism in communication with the integrated power source to recharge the integrated power source. In addition a visual display is provided that has a power supply separate from the integrated power source of the portable computing device and a complementary wireless communication module, the portable visual display in communication with the high speed, secure wireless communication module through the complementary wireless communication module. The portable computing device and the visual display do not share a physical connection.

20 Claims, 2 Drawing Sheets (58) Field of Classification Search
USPC .......................................................... 713/300
See application file for complete search history.

(56) References Cited

U.S. PATENT DOCUMENTS

| | | | | |
|---|---|---|---|---|
| 6,985,355 B2* | 1/2006 | Allirot | ................... | G06F 1/181 |
| | | | | 361/679.34 |
| 7,987,424 B2 | 7/2011 | Jones | | |
| 8,149,224 B1 | 4/2012 | Kuo et al. | | |
| 8,481,832 B2 | 7/2013 | Lloyd | | |
| 8,817,000 B1* | 8/2014 | Sauvage | ................... | G06F 1/28 |
| | | | | 345/207 |
| 9,368,006 B1* | 6/2016 | Gorilovsky | ............. | G08B 6/00 |
| 9,374,477 B2* | 6/2016 | Erkkila | ................. | G11B 27/30 |
| 9,514,066 B1* | 12/2016 | Diaz | ................... | G06F 13/102 |
| 9,523,964 B2* | 12/2016 | Zhang | ................. | G04G 17/045 |
| 9,904,254 B1* | 2/2018 | Hariri | ................... | G04G 17/08 |
| 2003/0154291 A1 | 8/2003 | Ocheltree et al. | | |
| 2003/0160767 A1* | 8/2003 | Wong | ................... | G06F 1/1601 |
| | | | | 345/169 |
| 2006/0099995 A1* | 5/2006 | Kim | ................... | H04M 1/0214 |
| | | | | 455/566 |
| 2007/0164980 A1* | 7/2007 | Manning | ................. | G06F 3/147 |
| | | | | 345/104 |
| 2007/0168648 A1* | 7/2007 | Mardiks | ............. | B60R 13/0243 |
| | | | | 712/36 |
| 2007/0236408 A1* | 10/2007 | Yamaguchi | ........... | G06F 3/1431 |
| | | | | 345/1.1 |
| 2008/0070633 A1* | 3/2008 | Knight | ................. | H01Q 9/0442 |
| | | | | 455/561 |
| 2008/0157711 A1* | 7/2008 | Chiang | ................. | G11B 33/12 |
| | | | | 320/101 |
| 2009/0196124 A1* | 8/2009 | Mooring | ............. | G04B 37/005 |
| | | | | 368/204 |
| 2010/0273532 A1* | 10/2010 | Schmitz | ................. | H04B 1/385 |
| | | | | 455/566 |
| 2011/0217950 A1* | 9/2011 | Kozlay | ................. | H04W 12/04 |
| | | | | 455/410 |
| 2011/0301836 A1 | 12/2011 | Hu et al. | | |
| 2012/0026376 A1 | 2/2012 | Goran | | |
| 2012/0172088 A1* | 7/2012 | Kirch | ................... | G06F 1/1626 |
| | | | | 455/557 |
| 2012/0244910 A1* | 9/2012 | Hsu | ........................ | G03B 21/10 |
| | | | | 455/566 |
| 2013/0012133 A1* | 1/2013 | Liu | ..................... | H04B 5/0031 |
| | | | | 455/41.3 |
| 2013/0100094 A1 | 4/2013 | Shingai et al. | | |
| 2013/0238702 A1 | 9/2013 | Sheth et al. | | |
| 2013/0282932 A1* | 10/2013 | Robert | ................ | G06F 11/3051 |
| | | | | 710/17 |
| 2013/0339409 A1* | 12/2013 | Kallio | ................ | A61B 5/02055 |
| | | | | 708/100 |
| 2014/0010367 A1* | 1/2014 | Wang | ................ | H04N 21/2347 |
| | | | | 380/210 |
| 2014/0233356 A1* | 8/2014 | Pattikonda | ........... | G04G 9/0064 |
| | | | | 368/13 |
| 2014/0378853 A1* | 12/2014 | McKinney | ......... | A61B 5/02438 |
| | | | | 600/509 |
| 2015/0084735 A1* | 3/2015 | Hunt | ...................... | G06F 1/163 |
| | | | | 340/5.6 |
| 2015/0094024 A1* | 4/2015 | Abiri | ...................... | G06F 13/14 |
| | | | | 455/411 |
| 2015/0126121 A1* | 5/2015 | Noh | ..................... | H04W 76/023 |
| | | | | 455/41.2 |
| 2015/0130623 A1* | 5/2015 | Robison | ................ | G08B 21/18 |
| | | | | 340/636.1 |
| 2015/0220110 A1* | 8/2015 | Brawer | ................. | G04G 11/00 |
| | | | | 361/679.03 |
| 2015/0248662 A1* | 9/2015 | Fiorelli | ................ | G06Q 20/204 |
| | | | | 705/21 |
| 2015/0358790 A1* | 12/2015 | Nasserbakht | ..... | G06F 17/30088 |
| | | | | 455/414.1 |
| 2016/0012432 A1* | 1/2016 | Meshkati | ........... | G06Q 20/3821 |
| | | | | 705/44 |
| 2016/0057268 A1* | 2/2016 | Jiang | ....................... | H04B 5/00 |
| | | | | 455/556.1 |
| 2016/0342784 A1* | 11/2016 | Beveridge | ............... | H04L 67/08 |
| 2017/0163795 A1* | 6/2017 | Kuang | ................... | H04B 1/385 |

FOREIGN PATENT DOCUMENTS

| | | |
|---|---|---|
| WO | 2003065227 A1 | 8/2003 |
| WO | 2005083559 A1 | 9/2005 |
| WO | 2006101791 A1 | 9/2006 |
| WO | 2009120984 A1 | 10/2009 |
| WO | 2012047213 A1 | 4/2012 |
| WO | 2013103726 A1 | 7/2013 |

OTHER PUBLICATIONS

Raghunathan et al., "Experience with a Low Power Wireless Mobile Computing Platform", ISLPED, Aug. 9-11, 2004, pp. 363-368.

Spooner, "IBM Plays with Chameleon-Like Computer", CNET news, Feb. 5, 2002.

* cited by examiner

DISAGGREGATED MOBILE CLIENT

FIELD OF THE INVENTION

The present invention relates to mobile computing systems and mobile clients.

BACKGROUND OF THE INVENTION

In the current generation of mobile computing devices and mobile clients, the cost and power consumption of such devices are driven primarily by the visual displays. While a large display is desirable from a usability perspective, the size of the display is constrained by the practicality of the size of the mobile computing device itself, e.g., what can fit in a pocket or purse conveniently. Also, while the storage and processing capabilities of mobile computing devices are increasing rapidly, battery technology is not improving as steadily. This development gap leads to visual displays being the major drain on power in mobile computing devices. An examination of the bill of materials for a typical mobile computing device such as a smart phone illustrates that the visual display is the single most expensive component. This high cost is likely to remain into at least the near future.

With the availability of displays including television and computer monitors throughout homes and offices and the advent of new display technologies including flexible displays and projection based displays, a large number of visual displays are available to users of mobile computing devices. However, all these visual display technologies have high associated costs and significant power requirements, making any mobile computing device that houses one of these technologies less attractive from a cost and power consumption perspective. Therefore, mobile computing systems are desired that take advantage of the large variety of available visual display technologies while controlling the cost and power consumption needs of those mobile computing devices.

SUMMARY OF THE INVENTION

Systems and methods in accordance with the present invention provide mobile computing devices including mobile clients where the computing and storage components of the mobile computing device are separated from the visual display components required by the mobile computing device. The hardware components associated with the computing and storage functions are shrunk into a small form factor, reducing the required power consumption significantly. The visual display is physically separated from the computing and storage hardware components and is linked to the computing and storage device through a secure wireless high speed coupling such as a mm wave or extremely high frequency (EHF) based connection. This wireless connection is used to transfer the data to be displayed on the visual display and the user inputs to the visual display or other user input device. Both the computing and storage hardware components and the visual display have their own independent power sources, as the visual display has higher power demands and in a portable application will require more frequent charging. Decoupling the computing and storage hardware from the display facilitates the use of multiple displays for a given portable computing device and the incorporation of technologies such as projection displays that provide a large surface for viewing without requiring a LED or LCD screen. As the power consumption of the computing and storage hardware that have been decoupled or disaggregated from the display is significantly lowered, portable, passive or automatic recharging technologies such as photovoltaic, e.g., solar, chargers, electrochemical chargers, fuel cells and automatic mechanical devices that harness the movement of the portable computing device and the user that is holding or wearing the portable computing device can be used.

In accordance with one exemplary embodiment, the present invention is directed to a portable computing device consisting essentially of a logical processor, a memory in communication with the logical processor and containing operating system software that when executed by the logical processor provides all operating functions of the computing device, a wireless communication module in communication with the logical processor, an integrated power source suitable to provide all power needs of the portable computing device and an integrated electric power generation mechanism in communication with the integrated power source to recharge the integrated power source. The memory further can also include application software that when executed by the logical processor provides functionality to the portable computing device associated with that application software. Suitable wireless communication modules include a WIFI communication module, a cellular communication module and a millimeter-wave communication module. In one embodiment, the wireless communication module is a secure, high speed wireless communication module. In one embodiment, the integrated power source includes a rechargeable battery, and the integrated electric power generation mechanism is a photovoltaic electric power generation mechanism or an automatic mechanical electric power generation mechanism that harnesses movement of the portable computing device.

In one exemplary embodiment, the present invention is directed to a portable computing device consisting essentially of a logical processor, a memory in communication with the logical processor and containing operating system software that when executed by the logical processor provides all operating functions of the computing device, an integrated power source suitable to provide all power needs of the portable computing device and a high speed, secure wireless communication module in communication with the logical processor. The wireless communication module can be a WIFI communication module, a millimeter-wave communication module or a cellular communication module. In one embodiment, the integrated power source is a rechargeable battery.

In accordance with one exemplary embodiment, the present invention is directed to a portable computing system containing a portable computing device consisting essentially of a logical processor, a memory in communication with the logical processor and containing operating system software that when executed by the logical processor provides all operating functions of the computing device, a high speed, secure wireless communication module in communication with the logical processor, an integrated power source suitable to provide all power needs of the portable computing device and an integrated electric power generation mechanism in communication with the integrated power source to recharge the integrated power source. The portable computing system also includes a visual display that includes a power supply separate from the integrated power source of the portable computing device and a complementary wireless communication module. The portable visual display is in communication with the high speed, secure wireless communication module through the complementary wireless communication module. The portable computing device and the visual display do not share a physical connection and only communicate and share data wirelessly. In one embodiment, the visual display is a portable, flexible display. Alternatively, the visual display is a projection display.

In one embodiment, the portable computing system includes a plurality of visuals displays. Each visual display has a separate power supply and the complementary wireless communication module. The portable computing device communicates data to be displayed simultaneously on the plurality of visual displays. In one embodiment, the complementary wireless communication module utilizes a dongle. In one embodiment, the portable computing system includes a plurality of peripheral input and output devices. Each input and output device includes a peripheral device power supply that is separate from the integrated power source of the portable computing device and a peripheral device wireless communication module, e.g., integrated or a dongle. Each input and output device is in communication with the high speed, secure wireless communication module through the peripheral device wireless communication module. Suitable peripheral input and output devices include personal computers, keyboards, cellular phones, personal digital assistants, point and click devices and joy sticks.

DETAILED DESCRIPTION

Exemplary embodiments in accordance with the present invention provide for portable computing devices or mobile clients that are configured to be carried or worn by a user, for example as a locket that is worn on a chain or lanyard, as a bracelet or as a wristwatch, and that include the computing resources, i.e., a processor, storage resources, i.e., memory, communication resources, e.g., cellular, WIFI, Bluetooth and secure high speed wireless communication, power sources including a rechargeable source of power and software, including operating system software and application software. One or more visual displays can also be provided separate from and independent of the portable computing device. The visual displays are not integrated into or otherwise physically connected to the portable computing devices. Suitable visual displays include, for example, a traditional touch panel type display, a flexible display such as flexible e-paper and a projection type display. The display is provided with all of the components required for operation of that display independent of the portable computing device, including a power source, processing and storage resources, firmware and complimentary communication resources. Suitable visual displays can be generic, non-personalized visual displays that are independent of any given portable computing device. In one embodiment, a portable visual display is provided with the portable computing device as a portable computing system. A dongle with the appropriate hardware and firmware can also be provided for attachment to an existing visual display so that the portable computing device can communicate with that existing visual display, e.g., a television or LCD computer monitor.

The processing, storage and communication capacities of the portable computing device provide for the same type of operations performed by any computing system, for example local area and wide area networking that can be used for cloud based computing and storage, cellular network communication, secure high speed coupling to peripheral devices and multi-tasking with multiple concurrent instances of various types of software applications including word processing, web browsing and electronic mail applications. Each portable computing device can also be used with multiple concurrent visual displays.

In one embodiment, the portable computing device communicates with existing visual displays such as computer monitors and televisions using a plugged-in dongle, e.g., through a universal serial bus (USB) connection. In addition, the wireless interface of the portable computing system facilitates simultaneous communication with multiple visual displays. Therefore, different connectivity modes for the portable computing system are possible, e.g., one portable computing device to one visual display, one portable computing device to a plurality of visual displays, a plurality of portable computing devices to one visual display and a plurality of portable computing devices to a plurality of portable display. This connectivity mode flexibility provides, for example, the use of software applications such as multi-user gaming where each user plays on a different visual display and input device, and all of the visual displays and input devices are connected to the same portable computing device. The flexibility of the portable computing device of the present invention utilizes an efficient high-speed wireless communications protocol to combine its computing and storage components to the visual displays. This efficient high-speed wireless communication protocol combines the flexible discovery and attachment mechanism found, for example in Bluetooth, with a higher speed of communication and a more secure and usable manner for associating between the computing and storage modules and the visual display. The portable computing device connects to each visual display in a secure manner without the clumsiness of current Bluetooth infrastructure. In one embodiment, the portable computing device and the visual display are securely coupled by bringing the two devices into brief contact with each other, i.e., by having them touch or bump. The established secure connection is then maintained seamlessly thereafter.

Multiple wireless technologies with different energy consumption to data rate trade-offs can be used depending on the instantaneous usage of the portable computing device. For example, low power, including lower power mm-wave communications can be leveraged for high data rate communications, while WI-FI can be used for lower data rate modes. In one embodiment, the portable computing device includes a wireless communications chip that is reconfigurable in order to provide various power modes depending on the instantaneous requirement.

The decoupled computing and storage of the portable computing device of the present invention has a power consumption profile low enough to enable automatic or portable charging, for example by photovoltaic, e.g., solar, chargers, electrochemical chargers, fuel cells and automatic mechanical devices that harness the movement of the portable computing device imparted, for example, by the movement of the user that is holding or wearing the portable computing device and combinations thereof. In one embodiment, power hungry sensors are also decoupled from the portable computing device and can be moved, for example, to the visual display unit in order to facilitate the self-charging aspects of the portable computing device. In accordance with exemplary embodiments of the preset invention, the portable computing device is user-specific or personalized, but the visual displays are not. Therefore, the visual displays are sharable among multiple portable electronic devices, fungible and easily replaceable. For example, when a powered visual display such as a desktop computer monitor is available, this display can be used rather than a handheld visual display. In fact, the portable computing device is usable with any available display such as a computer monitor, television or projector through an inexpensive dongle connected to the display.

In addition, communication is not limited to visual devices or input/output devices such as touchscreens. The portable computing system can communicate with other I/O devices through its wireless interface including other computing systems, keyboards, cellular phones, personal digital assistants, point and click devices and joy sticks. The type of input and output devices are not constrained by the form factor of a handheld display. Power hungry techniques such as gesture recognition can be easily incorporated into the user experience. Moreover, since the visual display is not personalized, when a mobile visual display runs out of charge, it can be seamlessly replaced by another mobile visual display without any loss of functional continuity. Input and output devices, being generic, can be shared among portable electronic devices, borrowed and lent without privacy concerns. Since communication with the visual display is wireless, specific physical I/O ports do not have to be integrated into the visual displays.

Figure 1:
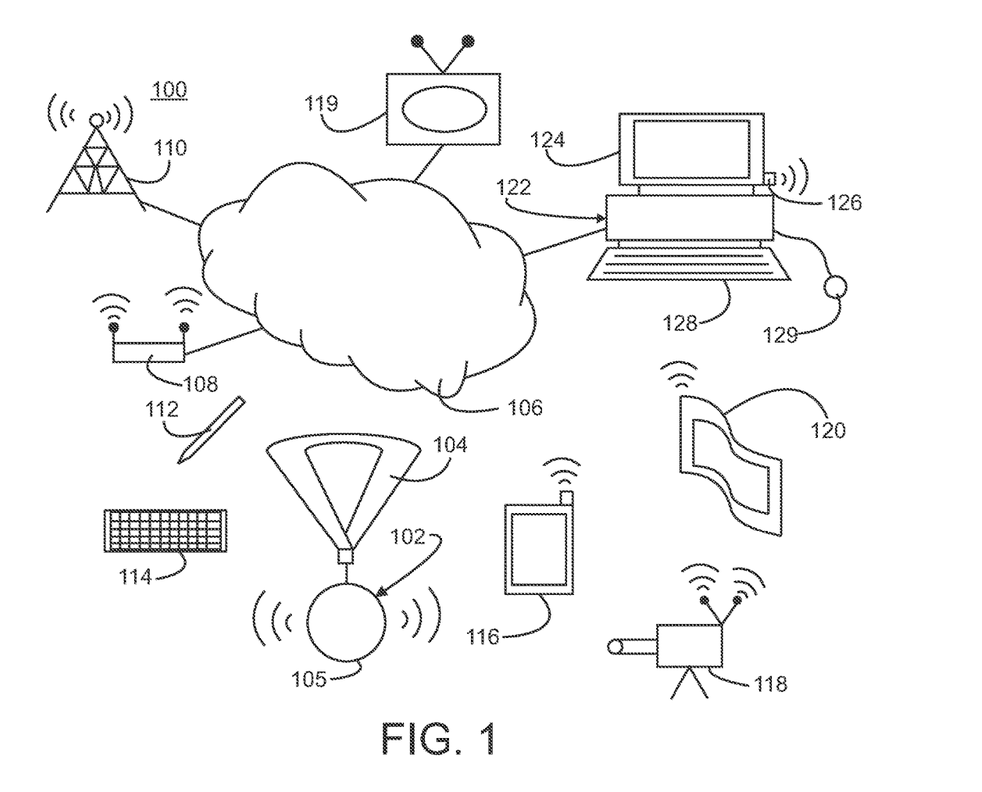
FIG. 1 is a schematic representation illustrating an embodiment of a portable computing system in accordance with the present invention.

Referring initially to FIG. 1, an exemplary embodiment of a portable computing system 100 in accordance with the present invention is illustrated. The portable computing system includes a portable computing device 102. The portable computing device is arranged with a form factor that makes is easy for the portable computing device to be carried or worn by the user of the portable computing device. For example, the portable computing device can be carried in the pocket of the user or worn on the belt or waistband of the user. The portable computing device can be configured as a bracelet, wristwatch or pin. As illustrated, the portable computing device has a case 105 that is shaped as a pendant that is attached to a lanyard 104 or other necklace to be worn around the neck of the user. The portable computing device is a displayless portable computing device. Therefore, the portable computing device does not have a visual display that is integrated into its case and is not physically connected to a visual display.

Other than a visual display, all of the hardware, software, power and communication requirements for full functioning of these portable computing devices are integrated into the portable computing device. In one embodiment, the portable computing device consists of or consists essentially of, a logical processor, a memory in communication with the logical processor and containing operating system software that when executed by the logical processor provides all operating functions of the computing device, at least one wireless communication module in communication with the logical processor, an integrated power source suitable to provide all power needs of the portable computing device and an integrated electric power generation mechanism in communication with the integrated power source to recharge the integrated power source. Therefore, the portable computing device can function continuously and autonomously while being worn or carried by the user without being constrained by the form factor and power requirements dictated by an integrated visual display.

The portable computing device utilizes the integrated communication module or communication modules to provide wireless communication with, for example, a WIFI base station 108 or a cellular network 110. The integrated communication module can also provide high speed wireless communication through a high speed communication link such as a millimeter-wave (mm-wave) wireless communication link, a WIFI communication module, a cellular communication link such as a cellular 5G communication link, or a Bluetooth wireless link. In one embodiment, the integrated communication module provides high speed wireless communication through multi-gigabit speed wireless (Wi-Gig) that provides wireless communications over the 60 GHz frequency band. In one embodiment, an antenna beam steering/beam switching technology is used, for example phased array antennas, for communicating between the device and the display. This yields higher data rates in particular for multiple devices being used in a confined space. Since thee computing device and display device may not move quickly with respect to each other, beam steering can be used. In one embodiment, the device to device (D2D) and machine to machine (M2M) features of advanced cellular networks such as 5G can be used for the device to display wireless communications. The integrated communication module is used to communicate with a plurality of visual displays and other input and output devices either directly through one or more wide area or local area networks 106.

Therefore, portable computing systems 100 in accordance with exemplary embodiments of the present invention include at least one or alternatively a plurality of visual displays including portable visual displays. Suitable visual displays include, but are not limited too, a portable, handheld touch screen 116, for example having a form factor comparable to a cellular phone or smart phone, a projection display 118, a portable flexible display 120, for example an e-paper display, an LED or LCD display 124 associated with a network connected computing system 122, a television 119, glasses, and heads-up displays and other monitors provided in automobiles.

In general, each visual display includes a power supply that is separate from the integrated power source of the portable computing device. Therefore, the visual display provides its own power independent of the integrated power source of the portable computing device. The visual display includes a complementary wireless communication module to the wireless communication module located within the portable communication device. The portable visual display is in communication with the wireless communication module of the portable computing device through this complementary wireless communication module. This complementary communication device can be integrated into the visual display or into computing systems to which the visual display is attached. In one embodiment, the portable computing system includes a dongle 126 that is attached to the visual display. The dongle includes the required hardware and software, for example as firmware, that provides the desired communication link between the visual display and the portable computing device. The portable computing device wirelessly communicates the graphical data to be displayed on the visual display, and the portable computing device and the visual display do not share a physical connection. In one embodiment, a plurality of visuals displays is utilized with each visual display having its own separate power supply and the complementary wireless communication module. The portable computing device communicates graphical data to be displayed simultaneously on the plurality of visual displays. Therefore, the portable computing device can utilize multiple, simultaneous visual displays or can move seamlessly among multiple visual displays. These visual displays can all display the same graphical information or each can be used to display separate graphical information.

The portable computing system also includes a plurality of additional input and output devices that are also wirelessly connected to the portable computing device. These input and output devices include, but are not limited to, voice recognition modules, e.g., microphones, headphones, touch screens, pens 112, motion detection devices, wireless keyboards 114, keyboards 128 attached to networked computing systems 122, point and click devices 129 attached to networked computing systems 122, cameras and video recorders. In general, the wireless connectivity capabilities of the portable computing device allow this device to leverage any type of independent or peripheral computing device that can communicate directly with the portable computing device or with a network that is accessible by the portable computing device. All of these external devices are generic, and the portable computing device is specific to the user of that device. Therefore, the portable computing device is a self contained, self-powered, user-specific computing device that can leverage any existing infrastructure of networked computing systems, peripheral devices and stand alone computers. As these devices are generic, the portable computing system of the present invention leverages the existing computing system infrastructure for a plurality of separate portable computing devices. In addition, the portable computing system can utilize cloud-based computing for communication, storage and computational capacity.

Figure 2:
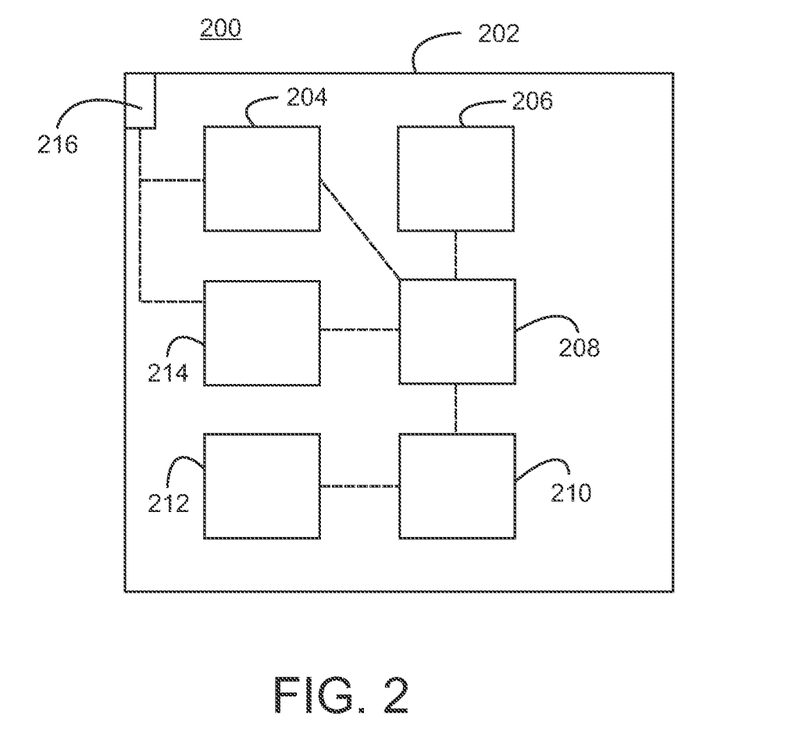
FIG. 2 is a schematic representation illustrating an embodiment, of a portable computing device in accordance with the present invention.

Referring to FIG. 2, an exemplary embodiment of a portable computing device 200 for use in accordance with the present invention is illustrated. In general, the portable computing device is a self-contained computing device that provides all of the hardware, software, communication and power requirements of the computing device without an integrated or physically attached visual display. For example, these types of portable computing devices provide the computing and storage functionality of a cellular phone, a smart phone, a personal digital assistance, a tablet computer or a laptop or desktop computer. All of these components are provided within a case 202 having a small form factor that makes it easily carried or worn by a user. In one embodiment, the portable computing device includes a logical processor 208. Suitable logical processors provide all of the required logical processing for the operation of the portable computing device in a small form factor with low power requirements. The portable computing device also includes at least one memory 206 in communication with the logical processor. The memory includes operating system software that when executed by the logical processor provides all operating functions of the computing device. In one embodiment, the memory also includes application software that when executed by the logical processor provides functionality to the portable computing device associated with that application software, for example, word processing programs, E-mail programs and games.

The portable computing device includes at least one wireless communication module 204 in communication with the logical processor. This wireless communication module can be in communication with an antenna 216 and provides wireless connectivity between the portable computing device and networks, visual displays, other computers and other peripheral computing devices, for example, cameras. Any suitable communication module can be used, including, but not limited to, WIFI, Bluetooth, mm-wave and cellular communication modules. Preferably, the communication module provides high speed communication while minimizing the power consumption needs of the portable computing device. In addition, the communication module is preferably a secure communication module that provides for secure communication of data between the portable computing device and any peripheral device, computing system or visual display. Suitable secure communication protocols are known and available in the art. In one embodiment, the portable computing device also includes at least one secondary communication module 214 that is also in communication with the antenna 216. The secondary communication module can be used to provide cellular or other network communications, while the first communication module 204 provides the secure, high-speed, low power communication with the visual displays and other peripheral input and output devices. In one embodiment, the portable computing device is in communication with an external WIFI or cellular communication module through the first communication module 204.

The portable computing device includes at least one integrated power source 210. The integrated power source is in communication with all of the internal components of the portable computing device and is suitable to provide all power needs of the portable computing device. Suitable integrated power sources include, but are not limited to, batteries including rechargeable batteries. In order to extend the operating cycle of the portable computing device and to minimize or to eliminate the need for the portable computing device to be attached to a recharging system, the portable computing system includes an integrated electric power generation mechanism 212 in communication with the integrated power source to recharge the integrated power source. Suitable electric power generation mechanisms include, but are not limited to, photovoltaic, e.g., solar, chargers including the required photovoltaic cells integrated into the case 202, electrochemical chargers, fuel cells, automatic mechanical devices that harness the movement of the portable computing device imparted, for example, by the movement of the user that is holding or wearing the portable computing device and combinations thereof.

As will be appreciated by one skilled in the art, aspects of the present invention may be embodied as a system, method or computer program product. Accordingly, aspects of the present invention may take the form of an entirely hardware embodiment or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to apparatus (systems) and computer program products according to embodiments of the invention. It will be understood that each description and illustration can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the block diagram block or blocks.

The schematic illustrations and block diagrams in the Figures illustrate the architecture, functionality, and operation of possible implementations of systems, methods and computer program products according to various embodiments of the present invention. In this regard, each block in the block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams, and combinations of blocks in the block diagrams, can be implemented by special purpose hardware-based systems that perform the specified functions or acts, or combinations of special purpose hardware and computer instructions.

Methods and systems in accordance with exemplary embodiments of the present invention can take the form of an entirely hardware embodiment, an entirely software embodiment or an embodiment containing both hardware and software elements. In a preferred embodiment, the invention is implemented in software, which includes but is not limited to firmware, resident software and microcode. In addition, exemplary methods and systems can take the form of a computer program product accessible from a computer-usable or computer-readable medium providing program code for use by or in connection with a computer, logical processing unit or any instruction execution system. For the purposes of this description, a computer-usable or computer-readable medium can be any apparatus that can contain, store, communicate, propagate, or transport the program for use by or in connection with the instruction execution system, apparatus, or device. Suitable computer-usable or computer readable mediums include, but are not limited to, electronic, magnetic, optical, electromagnetic, infrared, or semiconductor systems (or apparatuses or devices) or propagation mediums. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Suitable data processing systems for storing and/or executing program code include, but are not limited to, at least one processor coupled directly or indirectly to memory elements through a system bus. The memory elements include local memory employed during actual execution of the program code, bulk storage, and cache memories, which provide temporary storage of at least some program code in order to reduce the number of times code must be retrieved from bulk storage during execution. Input/output or I/O devices, including but not limited to keyboards, displays and pointing devices, can be coupled to the system either directly or through intervening I/O controllers. Exemplary embodiments of the methods and systems in accordance with the present invention also include network adapters coupled to the system to enable the data processing system to become coupled to other data processing systems or remote printers or storage devices through intervening private or public networks. Suitable currently available types of network adapters include, but are not limited to, modems, cable modems, DSL modems, Ethernet cards and combinations thereof.

In one embodiment, the present invention is directed to a machine-readable or computer-readable medium containing a machine-executable or computer-executable code that when read by a machine or computer causes the machine or computer to perform a method for providing a small form feature, displayless portable computing system or portable client in accordance with exemplary embodiments of the present invention and to the computer-executable code itself. The machine-readable or computer-readable code can be any type of code or language capable of being read and executed by the machine or computer and can be expressed in any suitable language or syntax known and available in the art including machine languages, assembler languages, higher level languages, object oriented languages and scripting languages. The computer-executable code can be stored on any suitable storage medium or database, including databases disposed within, in communication with and accessible by computer networks utilized by systems in accordance with the present invention and can be executed on any suitable hardware platform as are known and available in the art including the control systems used to control the presentations of the present invention.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s) and steps or elements from methods in accordance with the present invention can be executed or performed in any suitable order. Therefore, it will be understood that the appended claims are intended to cover all such modifications and embodiments, which would come within the spirit and scope of the present invention.

What is claimed is:

1. A portable computing device consisting essentially of:
   a logical processor;
   a memory in communication with the logical processor and comprising operating system software that when executed by the logical processor provides all operating functions of the computing device;
   a wireless communication module in communication with the logical processor;
   an integrated power source suitable to provide all power needs of the portable computing device; and
   an integrated electric power generation mechanism in communication with the integrated power source to recharge the integrated power source.

2. The portable computing device of claim 1, wherein the memory further comprises application software that when executed by the logical processor provides functionality to the portable computing device associated with that application software.

3. The portable computing device of claim 1, wherein the wireless communication module comprises a WIFI communication module.

4. The portable computing device of claim 1, wherein the wireless communication module comprises a millimeter-wave communication module.

5. The portable computing device of claim 4, wherein the wireless communication module further comprises a secure, high speed wireless communication module.

6. The portable computing device of claim 1, wherein the wireless communication module comprises a cellular communication module.

7. The portable computing device of claim 1, wherein the integrated power source comprises a rechargeable battery.

8. The portable computing device of claim 1, wherein the integrated electric power generation mechanism comprises a photovoltaic electric power generation mechanism.

9. The portable computing device of claim 1, wherein the integrated electric power generation mechanism comprises an automatic mechanical electric power generation mechanism that harnesses movement of the portable computing device.

10. A portable computing device consisting essentially of:
    a logical processor;
    a memory in communication with the logical processor and comprising operating system software that when executed by the logical processor provides all operating functions of the computing device;
    an integrated power source suitable to provide all power needs of the portable computing device; and
    a high speed, secure wireless communication module in communication with the logical processor.

11. The portable computing device of claim 10, wherein the wireless communication module comprises a WIFI communication module.

12. The portable computing device of claim 10, wherein the wireless communication module comprises a millimeter-wave communication module.

13. The portable computing device of claim 10, wherein the wireless communication module comprises a cellular communication module.

14. The portable computing device of claim 10, wherein the integrated power source comprises a rechargeable battery.

15. A portable computing system comprising:
    a portable computing device consisting essentially of:
        a logical processor;
        a memory in communication with the logical processor and comprising operating system software that when executed by the logical processor provides all operating functions of the computing device;
        a high speed, secure wireless communication module in communication with the logical processor;
        an integrated power source suitable to provide all power needs of the portable computing device; and
        an integrated electric power generation mechanism in communication with the integrated power source to recharge the integrated power source; and
    a visual display comprising:
        a power supply separate from the integrated power source of the portable computing device; and
        a complementary wireless communication module, the visual display in communication with the high speed, secure wireless communication module through the complementary wireless communication module;
    wherein the portable computing device and the visual display do not share a physical connection.

16. The portable computing system of claim 15, wherein the visual display comprises a portable, flexible display.

17. The portable computing system of claim 15, wherein the visual display comprises a projection display.

18. The portable computing system of claim 15, wherein the portable computing system further comprises a plurality of visuals displays, each visual display comprising the separate power supply and the complementary wireless communication module and the portable computing device communicating data to be displayed simultaneously on the plurality of visual displays.

19. The portable computing system of claim 15, wherein the complementary wireless communication module comprises a dongle.

20. The portable computing system of claim 15, further comprising a plurality of peripheral input and output devices, each input and output device comprising:
- a peripheral device power supply that is separate from the integrated power source of the portable computing device; and
- a peripheral device wireless communication module, each input and output device in communication with the high speed, secure wireless communication module through the peripheral device wireless communication module;

wherein the input and output devices comprise personal computers, keyboards, cellular phones, personal digital assistants, point and click devices or joy sticks.

* * * * *